United States Patent [19]
Marco et al.

[11] Patent Number: 6,025,284
[45] Date of Patent: Feb. 15, 2000

[54] SUN PROTECTIVE FABRIC

[76] Inventors: Francis W. Marco, 201 Thomas Rd., Pauline, S.C. 29374; Max T. Hyde, 1022 W. Bulford St., Apt. 1301, Gaffney, S.C. 29341; Bennie H. Reynolds, 306 Bermuda Rd., Union, S.C. 29379

[21] Appl. No.: 08/982,193

[22] Filed: Dec. 1, 1997

[51] Int. Cl.$^7$ ............................. B32B 27/12; B32B 5/14
[52] U.S. Cl. ........................ 442/133; 442/131; 428/913; 428/409; 8/120
[58] Field of Search .................... 442/133, 131; 428/913, 409; 8/120

[56] References Cited

U.S. PATENT DOCUMENTS

| | | | |
|---|---|---|---|
| 2,989,416 | 6/1961 | Standish | 442/133 |
| 3,020,699 | 2/1962 | Nijkamp et al. | 57/157 |
| 3,353,151 | 11/1967 | Rockwell | 340/15.5 |
| 3,373,774 | 3/1968 | Cruz | 139/420 |
| 3,377,249 | 4/1968 | Marco | 8/115.6 |
| 3,540,835 | 11/1970 | Marco | 8/115.6 |
| 3,563,795 | 2/1971 | Williams | 117/139.4 |
| 3,574,620 | 4/1971 | Tesoro | 117/62.1 |
| 3,598,641 | 8/1971 | Miller et al. | 117/138.8 E |
| 3,620,826 | 11/1971 | Machell | 117/139.5 C |
| 3,625,754 | 12/1971 | Dunn | 117/138.8 F |
| 3,632,420 | 1/1972 | Kuhn | 117/138.8 F |
| 3,649,165 | 3/1972 | Cotton | 8/115.5 |
| 3,650,801 | 3/1972 | Hinton, Jr. et al. | 117/47 A |
| 3,652,212 | 3/1972 | Machell | 8/115.5 |
| 3,660,010 | 5/1972 | Georgoudis et al. | 8/115.6 |
| 3,676,052 | 7/1972 | Harper, Jr. et al. | 8/115.6 |
| 3,690,942 | 9/1972 | Vandermass et al. | 117/138.8 F |
| 3,897,206 | 7/1975 | Kearney | 8/120 |
| 3,981,807 | 9/1976 | Raynolds | 252/8.8 |
| 4,014,857 | 3/1977 | Schmoyer | 260/67.6 R |
| 4,068,035 | 1/1978 | Violland et al. | 428/279 |
| 4,073,993 | 2/1978 | Lark | 428/261 |
| 4,090,844 | 5/1978 | Rowland | 8/120 |
| 4,131,550 | 12/1978 | Marco | 252/8.6 |
| 4,164,392 | 8/1979 | Hauser et al. | 8/18 R |
| 4,168,954 | 9/1979 | Marco | 8/18 R |
| 4,207,071 | 6/1980 | Lipowitz et al. | 8/115.6 |
| 4,290,765 | 9/1981 | Sandler | 8/115.6 |
| 4,427,557 | 1/1984 | Stockburger | 252/8.7 |
| 4,576,611 | 3/1986 | Pacoe, Sr. | 8/482 |
| 4,857,305 | 8/1989 | Bernhardt et al. | 424/59 |
| 4,861,651 | 8/1989 | Goldenhersh | 428/255 |
| 4,892,557 | 1/1990 | Conklin et al. | 8/497 |
| 4,937,277 | 6/1990 | O'Lenick, Jr. | 524/318 |
| 5,458,924 | 10/1995 | Kashiwai et al. | 427/389.9 |
| 5,498,468 | 3/1996 | Blaney | 428/198 |
| 5,503,917 | 4/1996 | Hughes | 428/229 |
| 5,637,348 | 6/1997 | Thompson et al. | 427/160 |
| 5,679,438 | 10/1997 | Ramdin et al. | 428/152 |

FOREIGN PATENT DOCUMENTS

| | | |
|---|---|---|
| 889292 | 6/1959 | United Kingdom . |

OTHER PUBLICATIONS

AATCC Test Method 124 –1996, "Appearance of Fabrics after Repeated Home Laundering".

"UV Stabilizers," *Kirk–Othmer Encyclopedia of Chemical Technology*, 4th Edition, pp. 622–624.

*Primary Examiner*—Daniel Zirker
*Attorney, Agent, or Firm*—Terry T. Moyer; William S. Parks

[57] ABSTRACT

Wrinkled fabrics comprising ultraviolet absorbers are disclosed which provide improvements in ultraviolet transmission, wearer comfort, and cost over those of the prior art. The preferred fabric is polyester and the preferred UV absorbers are chlorobenzotriazoles. The polyester is wrinkled permanently so as to provide an extra barrier to ultraviolet radiation from solely utilizing UV absorbers alone. This wrinkled product is also more comfortable to a wearer, particularly in warm weather or hotter climates. Other non-apparel uses are also contemplated including tents, awnings, and crowd covers. A method of making such a fabric is also disclosed comprising stuffing a jet dyeing machine with a more than normal load amount of fabric and eventually heat setting such resultant wrinkles into the finished product.

13 Claims, No Drawings

SUN PROTECTIVE FABRIC

FIELD OF THE INVENTION

This invention relates to fabrics which provide improved protection from the harmful effects of ultraviolet radiation. Methods of making such fabrics are also contemplated within this invention.

DISCUSSION OF THE PRIOR ART

The risks posed by ultraviolet radiation have become noteworthy in recent years as concerns over environmental issues, particularly the thinning of the earth's protective ozone layer, increase. For instance, incidences of skin cancer due to overexposure to solar radiation and thus harmful ultraviolet rays have been on the rise. Ultraviolet (UV) radiation which has proven harmful to human skin includes the two different types known as UV-A, which falls within the range of 320–400 nm along the light spectrum, and UV-B, which is between 290–320 nm in wavelength. Any manner of reducing or preventing transmission of UV light thus must effectively block or absorb such radiation between these wavelengths (290 and 400 nm).

Sun protective compositions for direct contact with a person's skin have been developed in order to better prevent the damaging results from such overexposure. For instance, PABA, or para-aminobenzoic acid, is a popular ultraviolet (UV) blocking compound, or absorber, which may be incorporated into a composition, such as a tanning lotion. This compound effectively absorbs the harmful radiation within the ultraviolet range of frequencies such that the user's skin is not fully exposed to such light. Generally, the greater concentration of such UV absorbers within a composition for skin application, the higher the sun protective factor (SPF) number the composition has. An SPF number is measured by the following equation: 100% transmission of UV light=SPF number. Thus, a composition permitting 20% transmission of UV light has a SPF# of 5; while a composition permitting 10% transmission has a SPF # of number of 10; and so on. However, even with such a protective barrier applied to unadorned areas of a person's body, the dangers of ultraviolet exposure remain since ultraviolet rays can penetrate most fabric barriers.

In order to decrease ultraviolet transmissions through clothing, past developments have provided protective measures from such harmful radiation through the introduction of certain compounds into or onto apparel fabrics. The prior art representative of this technology includes U.S. Pat. No. 4,857,305 to Bernhardt et al., U.S. Pat. No. 5,458,924 to Kashiwai et al., and U.S. Pat. No. 5,637,348 to Thompson et al, as well as United Kingdom Patent 889292 to American Cyanamid. Furthermore, certain types of weaves, twists, or bends of yarns or fabrics have been developed which effectively screen a wearer's skin from ultraviolet radiation. Such technology is represented within the prior art through U.S. Pat. No. 4,861,651 to Goldenhersh. With such chemically treated or physically modified fabrics, a wearer could then cover his or her skin more effectively solely through adorning themselves with such sun protective apparel. However, the prior art modified fabrics still permit transmission of relatively high levels of UV transmission or are generally uncomfortable, mostly usable in cold weather climates, and expensive to produce.

DESCRIPTION OF THE INVENTION

It is thus an object of the invention to provide an improved sun protective fabric, particularly for use in warmer weather or climates. A further object of the invention is to provide a relatively inexpensive fabric for use in apparel and which is an improvement over existing technology in protecting a wearer from the harmful effects of ultraviolet radiation. Another object of the invention is to provide a fabric for the sun protective apparel industry which is extremely comfortable for a wearer. Yet another object of this invention is to provide a fabric for use in any type of sun protective covering and not necessarily within apparel. Still a further object of the invention is to provide a method for producing such a sun protective fabric.

Accordingly, this invention concerns a fabric which is a three-dimensional article, due to its being continuously wrinkled (ie., heat-set into the form of the fabric) as defined by the AATCC Test Method 124-1996, "Appearance of Fabrics after Repeated Home Laundering," incorporated herein by reference, and which also has an ultraviolet absorber incorporated into either the individual yarns of the fabric or coated onto the surface of the finished fabric. Nowhere within the prior art has such a wrinkling or wrinkly appearance of fabric been utilized to reduce ultraviolet radiation transmission through the fabric. The preferred fabric is polyester, since it is relatively inexpensive to produce and, when manufactured in a wrinkled state, is very comfortable to wear. With such a wrinkled appearance and effect, the amount of fabric which is in contact with a wearer's skin is less than were such a fabric not wrinkled. As a result, any perspiration or other moisture which is present on the wearer's skin does not create an appreciable clinging effect between the fabric and the wearer's the skin. In warmer weather and climates, such a fabric would be extremely beneficial in alleviating the deleterious effect such moisture may have on a wearers comfort level.

The presence of wrinkles also provides a dramatic increase in protection from ultraviolet radiation. Since the light rays must strike the fabric at myriad differing angles, the amount of radiation which can pass through at high, and thus unacceptably dangerous levels, is diminished as compared to a non-wrinkled fabric. This advantage has neither been disclosed nor utilized within the prior art.

The term "wrinkle," "wrinkly," "wrinkled," or "wrinkles" according to this invention is defined as having an appearance of at most a grade of 2.5 on the Standard AATCC Three-Dimensional Appearance scale for the AATCC Test Method 124-1996, "Appearance of Fabrics after Repeated Home Laundering." Preferably, the grade is at most 2.0; more preferred is a grade of at most 1.5; and most preferred is a grade of at most 1.0. As utilized for the determination of wrinkling of the fabric of this invention, this test is not concerned solely with a post-laundered wrinkled appearance of the fabric. Such a wrinkled fabric as now contemplated within this invention is continuously wrinkled such that no matter what types of ironing or treatment for removing wrinkles are performed, the fabric will not lose its wrinkled appearance. Thus, it is requisite that every time the fabric of the invention is measured for appearance in accordance with the aforementioned AATCC Test Method 124-1996, either before or after laundering, the fabric must always retain an appearance grade of at most 2.5 or lower, as noted above.

Such particularly defined "wrinkled" fabric is manufactured in any manner which results in the required degree of permanent non-removable wrinkles within the fabric. The preferred method of wrinkling and chemically modifying the inventive fabric entails packing twice the normal load of fabric into a jet dyeing machine prior to finishing applications of the fabric and heat-setting the fabric after the dyeing procedure is completed. This method is further exemplified and explained below. Other well known methods of physically modifying fabric into a wrinkly appearance include: seersucker patterning, wherein a crinkled stripe is formed within the fabric by weaving some warp yarns tightly and other warp yarns loosely; gear embossing, wherein the fabric is wrinkled or puckered by passing such fabric through a set of heated rolls, one of which is a male roll and one of which is a female roll, which have a three-dimensional pattern on the surface; and stuffer box, wherein the fabric is stuffed into a heated chamber through the use of a series of mechanical fingers, and allowed to remain within the heated chamber for several minutes, and retrieved from the chamber through an opening at one end of the chamber. This list is not exhaustive and, again, any method which imparts a continuous and non-removable wrinkle to a fabric which meets the aforementioned AATCC Test Method ratings is contemplated within this invention.

The inventive fabric also incorporates an ultraviolet absorber into its individual yarns or onto its surface. As noted previously, UV absorbers are effective in blocking transmission of ultraviolet light rays. In particular, this invention contemplates the presence of any UV absorber which effectively reduces transmission of such harmful rays having wavelengths between 290 and 400 nm within the light spectrum. The amount of UV absorber present on the wrinkled fabric depends on the comparative cost to reduced UV transmission benefits possible.

Preferably, the amount introduced onto or incorporated within the wrinkled apparel fabric would be from about 0.01 to about 5% of the weight of the fabric (owf). More preferred is a range of from about 0.5 to about 3.0% owf, and most preferred is about 2% owf. Ultraviolet radiation absorbing compounds contemplated within this invention include those listed within the category "UV Stabilizers", Kirk-Othmer Encyclopedia of Chemical Technology, 4th edition, at pp. 622–24. Preferred compounds are those which contain benzotriazoles. More preferred are chlorobenzotriazoles. Most preferred is 2-(3'-Tertbutyl-2'hydroxy-5'methylphenyl)-5chlorobenzotriazole. The presence of such an ultraviolet radiation absorber permits increased protection from such harmful rays, especially when utilized within or on the wrinkled fabric as in the present invention.

Any other standard textile additives, such as dyes, sizing compounds, and softening agents may also be incorporated within or introduced onto the surface of the finished wrinkled apparel fabric substrate. Particularly desired as optional finishes to the inventive fabrics are soil release agents which improve the wettability and washability of the fabric. Preferred soil release agents include those which provide hydrophilicity to the surface of polyester. With such a modified surface, again, the fabric imparts improved comfort to a wearer by wicking moisture. The preferred soil release agents contemplated within this invention may be found in U.S. Pat. Nos. 3,377,249; 3,535,151; 3,540,835; 3,563,795; 3,574,620; 3,598,641; 3,620,826; 3,632,420; 3,649,165; 3,650,801; 3,652,212; 3,660,010; 3,676,052; 3,690,942; 3,897,206; 3,981,807; 3,625,754; 4,014,857; 4,073,993; 4,090,844; 4,131,550; 4,164,392; 4,168,954; 4,207,071; 4,290,765; 4,068,035; 4,427,557; and 4,937,277. These patents are accordingly incorporated herein by reference.

This sun protective fabric may be incorporated into a garment due to its advantageous UV blocking capability and its comfortability. Further uses for such a fabric include, without limitation: tents, awnings, crowd covers, and scarves.

DESCRIPTION OF THE PREFERRED EMBODIMENT

The preferred fabric of this invention is, as noted above, polyester. Other fabrics having relatively high UV resistance are contemplated, also. Cotton/polyester blends may also be utilized; however, due to the extremely high transmission percentage of ultraviolet radiation through cotton as compared to polyester, such a blend is not altogether desirable. Cotton fabric having a weight of about 9.0 ounces per square yard has UV light transmission measurements from 290 to 400 nm which are very high, roughly 28.4%, for a SPF # of 3.52. When cotton is wet, the percentage of UV transmission through the fabric increases dramatically. Furthermore, nylon is not effective at combating such harmful radiation, either, and its use alone is strongly discouraged. Nylon having a weight of about 4.0 ounces per square yard has an UV transmission percentage between 290 and 400 nm even higher than cotton's, about 41.9%, for a SPF # of 2.39. Any possible blends with polyester are acceptable, but, as with cotton, not desirable.

Also as noted above, the preferred UV absorbers utilized within or on the surface of the preferred wrinkled polyester fabric are benzotriazoles, in particular chlorobenzotriazoles, and most preferred 2-(3'-Tertbutyl-2'hydroxy-5'methylphenyl)-5-chlorobenzotriazole. Such compounds are relatively inexpensive and very safe to handle and apply to such fabric substrates. Furthermore, these compounds do not themselves cause any appreciable damage to a person's skin upon contact. These UV absorbers may be introduced within or onto the apparel fabric by any well known method. For instance, the UV absorber may be added to each individual yarn during the yarn finishing step by incorporating such a compound within the finishing composition or by adding such a UV absorber solution prior to or after the application of a yarn finishing composition. On a woven or knitted fabric, the UV absorber may be added to the surface utilizing such methods as padding, exhaustion, rolling, and so on. Particularly preferred as an application method is adding the UV absorber to the dye formulation within a jet dyeing machine and then introducing the fabric. The methods mentioned above are not exclusive of other available processes for applying the UV absorbers of this invention.

The following example is indicative of the preferred embodiment of this invention:

EXAMPLE 1

A 100% polyester fabric containing 70 denier 34 filament false twist texturized Dacron® 56T yarn as warp and filling was used. The fabric contained 104 warp ends per inch and the filling contained 82 picks per inch. The fabric weighed 2.4 ounces per square yard. The fabric was scoured and then dyed to a beige color in a Hisaka jet dyeing machine. Twice the normal size load of fabric was used and a 2% owf solution of 2-(3'-Tertbutyl-2'hydroxy-5'methylphenyl)-5-chlorobenzotriazole was added to the dye formulation which itself comprised standard disperse dyes and soil release agents. The fabric remained within the jet dyeing machine for a total of about 2 hours, was removed, dried and heat set on a tenter frame. The resultant product was permanently wrinkled at a grade of about 1.0 on the AATCC Test Method 124-1996 scale. The ultraviolet light transmission of this wrinkled fabric was measured on a Perkin-Elmer Lambda 9 UV spectrophotometer between the wavelengths of 290 and 400 nm. This transmission was measured to be 4.6% for an SPF # of 21.74.

For comparisons, the following samples were prepared:

EXAMPLE 2 (Comparative)

The same procedure was used as in Example 1 except that the jet dyeing machine was loaded with the normal amount of fabric, rather than double the amount. The resultant finished product was the same size in square feet as the wrinkled fabric of Example 1 but was not wrinkled in appearance. Its UV transmission between 290 and 400 nm measured 5.4% for an SPF # of 18.52. The addition of wrinkles to the polyester resulted in a sun protective factor increase of about 17.4% (21.74 SPF # −18.52 SPF #/18.52 SPF # multiplied by 100).

EXAMPLE 3 (Comparative)

The same procedure was used as in Example 2 except that no UV absorber was added to the dye formulation. The resultant finished fabric was the same size in square feet as that in Examples 1 and 2, was not wrinkled, and did not comprise any UV absorbing compounds. The fabric's UV transmission measurements between 290 and 400 nm were 19.5% for an SPF of 5.13. The addition of an UV absorber and the presence of wrinkles in this fabric resulted in a sun protective factor increase of about 324% (21.74 SPF # −5.13 SPF #/5.13 SPF 3-multiplied by 100).

There are, of course, many alternative embodiments and modifications of the present invention which are intended to be included within the spirit and scope of the following claims.

What we claim is:

1. A fabric comprising an ultraviolet absorber and having a wrinkled appearance of a grade of at most about 2.5 on the appearance scale of AATCC Test Method 124-1996, wherein said wrinkled appearance is permanent.

2. The fabric of claim 1 wherein said fabric is selected from the group consisting of polyester or polyester blends.

3. The fabric of claim 2 wherein said fabric is polyester.

4. The fabric of claim 1 wherein said ultraviolet absorber is a benzotriazole.

5. The fabric of claim 4 wherein said benzotriazole is a chlorobenzotriazole.

6. The fabric of claim 4 wherein said chlorobenzotriazole is 2-(3'-Tertbutyl-2'hydroxy-5'methylphenyl)-5-chlorobenzotriazole.

7. The fabric of claim 1 wherein said ultraviolet absorber is present in an amount of about 0.1–5% owf.

8. The fabric of claim 1 wherein said ultraviolet absorber is present in an amount of about 0.3–3% owf.

9. The fabric of claim 1 wherein said ultraviolet absorber is present in amount of about 2% owf.

10. The fabric of claim 6 wherein said 2-(3'-Tertbutyl-2'hydroxy-5'methylphenyl)-5chlorobenzotriazole is present in an amount of about 2%.

11. The fabric of claim 10 wherein said fabric is selected from the group consisting of polyester and polyester blends; and wherein said fabric has a wrinkled appearance of a grade of about 1.0 on the appearance scale of AATCC Test Method 124-1996.

12. The fabric of claim 1 which further comprises at least one dye and at least one soil release agent.

13. A garment comprising the fabric of claim 1.

* * * * *